United States Patent
Kassamali et al.

(10) Patent No.: US 8,856,211 B1
(45) Date of Patent: Oct. 7, 2014

(54) FLEXIBLE NETWORK TESTING

(75) Inventors: Faizal Kassamali, Seattle, WA (US);
Nathnael Bekele, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 629 days.

(21) Appl. No.: 12/895,686

(22) Filed: Sep. 30, 2010

(51) Int. Cl.
*G06F 15/16* (2006.01)

(52) U.S. Cl.
USPC .......................................................... 709/203

(58) Field of Classification Search
USPC ................................................ 709/201, 203
See application file for complete search history.

(56) References Cited

U.S. PATENT DOCUMENTS

| | | | |
|---|---|---|---|
| 7,743,090 B1 * | 6/2010 | Gibson et al. | 709/202 |
| 2002/0111162 A1 * | 8/2002 | Wendisch | 455/423 |
| 2006/0041827 A1 * | 2/2006 | Yamaoka et al. | 715/500 |
| 2010/0306595 A1 * | 12/2010 | Murata et al. | 714/39 |

* cited by examiner

*Primary Examiner* — Nicholas Taylor
*Assistant Examiner* — Andrew Woo
(74) *Attorney, Agent, or Firm* — Lowenstein Sandler LLP

(57) ABSTRACT

A client identifies one or more test parameters and one or more expected results for the test parameter, adds the test parameters and the expected test results to a client request, and sends the client request to a test server. The client then receives a response from the test server, and determines whether the server response includes the expected test result. If not, the client indicates that a test has failed. If so, the client indicates that the test is successful.

19 Claims, 6 Drawing Sheets

FLEXIBLE NETWORK TESTING

BACKGROUND

The widespread popularity of the World Wide Web ("Web") has provided various opportunities for computers to inter-communicate. For example, much current Web use involves clients requesting information from servers (e.g., via executing browser applications on the clients) and receiving the requested information in response. A client application and a server application communicate with each other using the Internet Protocol Suite. The Internet Protocol Suite includes four layers: the application layer (e.g., the hypertext transfer protocol (HTTP) layer), the transport layer (e.g., the transmission control protocol (TCP) layer), the Internet layer (e.g., the Internet protocol (IP) layer), and the link layer (e.g., the address resolution protocol (ARP) layer). A client and a server will not communicate as intended unless the software at all these layers functions properly. As the number of users relying on appropriate network communication continues to grow, finding effective ways to test network applications remains to be a priority.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for testing network communication in a client-server environment are described herein. A client may be any computing device that can connect to a network. Examples of such client devices include electronic book readers, cellular telephones, personal digital assistants (PDAs), portable media players, tablet computers, netbooks, and the like. A client hosts a network application that may connect to a network to obtain data from a server or to perform other activities. Data may include digital content (e.g., text, audio, video), software updates, instructions, or any other information.

A server may host a test service configured to perform different types of network communication testing without changing and/or recompiling the test service. A test may be intended to ensure proper communication when a client requests data from a server, when the format, the size or the contents of a client request is changed, when the format, the size, the contents or the status code of a server response is changed, etc. In one embodiment, a client network application includes a test module that identifies one or more parameters for a specific test and one or more expected results for this test, adds the test parameter(s) and the expected test results to a client request (e.g., to the URL of the client request), and sends the client request to the test service. An expected result may specify a test parameter value expected by the client, and a test parameter may identify the portion of a server response (e.g., a status code, a header or a body) that should include the expected test result.

In one embodiment, the test server receives the client request, extracts the expected test result(s), creates a response, adds the expected test result(s) to the response, and sends the response to the client network application. Upon receiving the server response, the test module of the client network application determines whether the server response includes the expected test result(s). If so, the test module indicates that the test was successful. If not, the test module indicates that the test has failed.

With embodiments of the invention, a test server no longer needs to be changed and recompiled each time a different network communication test is performed. Instead, a client network application sends an expected test result to the test server in a client request, and the test server simply extracts the expected test result from the request and sends a response with the expected test result to the client network application. When a different test is performed, the client network application sends an expected result for the different test to the test server, which will again extract the expected test result from the request and send a response with the expected test result to the client network application. Accordingly, a mechanism is provided that allows for a simplified and more efficient testing of network communication.

Figure 1:
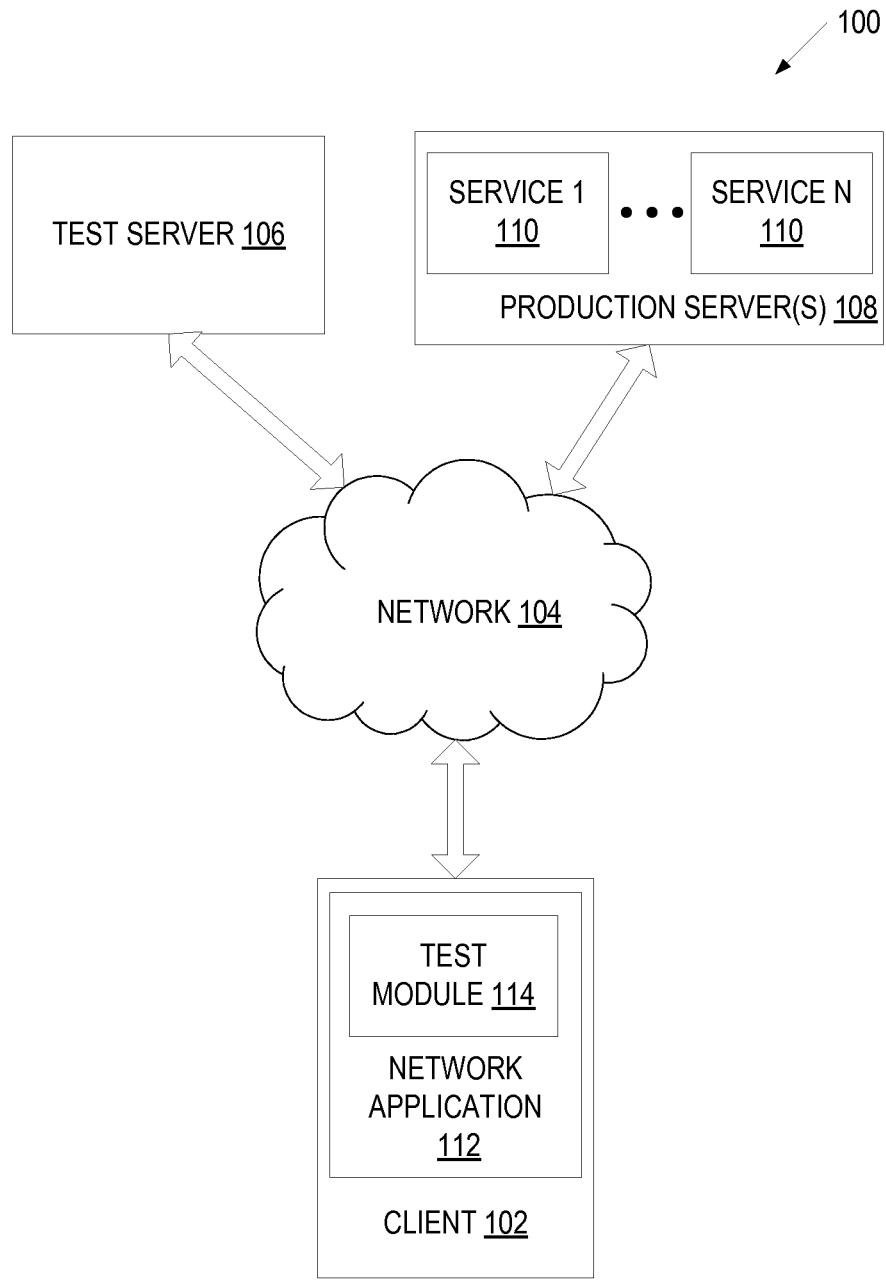
FIG. 1 is a block diagram of an exemplary network architecture in which embodiments of the invention may operate.

FIG. 1 is a block diagram of exemplary network architecture 100 in which embodiments of the invention may operate. The network architecture 100 may include one or more production severs 108, a test server 106 and a client device (client) 102 coupled via a network 104 (e.g., a public network such as the Internet, a private network such as a local area network (LAN), or a virtual private network (VPN)).

The client 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like. The production server(s) 108 may include a cloud server, a content provider server, a web server or any other server that provides various services to clients including the client 102. The production server(s) 108 may provide content (e.g., text, audio, video), upgrades, instructions and/or other information to the clients 102 via the network 104. The production server(s) 108 may also receive various requests, instructions and other data from the clients 102 via the network 104. The production server(s) 108 may include one or more machines (e.g., one or more server computer systems, routers, gateways) that have processing and storage capabilities to provide the above functionality.

Communication between the production server(s) 108 and a client 102 may be enabled via any communication infrastructure. One example of such an infrastructure includes a combination of a wide area network (WAN) or a VPN and wireless infrastructure, which allows a user to use the client 102 to connect to the production server(s) 108 without being tethered to the production server(s) 108 via hardwired links. The wireless infrastructure may be provided by a wireless carrier system that can be implemented using various data processing equipment, communication towers, etc. Alternatively, or in addition, the wireless carrier system may rely on satellite technology to exchange information with the client 102. Yet alternatively, or in combination, the wireless infrastructure may be provided by an access point (e.g., WiFi access point) provider system.

The communication infrastructure may also include a communication-enabling system that serves as an intermediary in passing information between the production server(s) 108 and the wireless carrier. The communication-enabling system may communicate with the wireless carrier via a dedicated channel, and may communicate with the production server(s) 108 via a non-dedicated communication mechanism, e.g., a public network such as the Internet. In some embodiments, the communication-enabling system includes a proxy server (not shown) that controls access to the production server(s) 108 by the clients 102, measures the usage of the productions server(s) 108 by the clients 102 and/or performs other functionality.

The test server 106 may include one or more machines (e.g., one or more server computer systems, routers, gateways) that have processing and storage capabilities to provide functionality discussed herein. The test server 106 is intended to test network communication between the client 102 and the production server(s) 108 to ensure proper functionality in the production environment. Communication between the test server 106 and the client 102 is enabled via a similar communication infrastructure as the one used for communication between the production server(s) 108 and the client 102 to mimic the production environment as closely as possible. In some embodiments, the client 102 communicates with the test server 106 via a proxy server if such a proxy server is used for communication between the client 102 and the production server(s) 108.

The client 102 hosts a network application 112 that may be a web browser, an email client application, an instant messaging client application, or any other application that communicates with a server via a network. Testing of network communication between a client application and a server may involve ensuring that the server receives and is able to understand the client requests, and that the client receives expected responses from the server and is able to understand the server response. Proper network communication may not only require that the client application and the server operate as noted above but also that the software at the application layer (e.g., the hypertext transfer protocol (HTTP) layer or the simple mail transfer protocol (SMTP) layer), the transport layer (e.g., the transmission control protocol (TCP) layer or the user datagram protocol (UDP) layer), the Internet layer (e.g., the Internet protocol (IP) layer), and the link layer (e.g., the address resolution protocol (ARP) layer) operate as intended. In embodiments where the client application communicates with the server via a proxy, it may also be needed to ensure that the proxy operates as intended.

In one embodiment, the test server 106 allows for network communication tests of different types. A test may be intended to ensure proper communication when the network application 112 requests data from a server, when the format, the size or the contents of a client request is changed, when the format, the size, the contents, the value, or the status code of a server response is changed, etc. In one embodiment, the network application 112 includes a test module 114 that cooperates with the test server 106 to perform various network communication tests. In particular, the test module 114 may identify one or more parameters for a specific test and one or more expected results for this test (e.g., based on user input provided via a user interface such as a GUI or a configuration file). An expected result may specify a test parameter value expected by the client, and a test parameter may identify the portion of a server response (e.g., a status code, a header or a body) that should include the expected test result. The test module 114 may then add the test parameter(s) and the expected test result(s) to a client request, and send the client request to the test server 106. The test module 114 may add the test parameters and the expected test results to the URL of the client request, to the header of the client request or to the body of the client request.

In one embodiment, the test server 106 hosts a test service designated for network communication testing. The test service may receive the client request, extract the expected test result(s), create a response, add the expected test result(s) to the response as specified in the client request, and send the response to the network application 112. Upon receiving the server response, the test module 114 determines whether the server response includes the expected test result(s). If so, the test module 114 indicates that the test was successful. If not, the test module 114 indicates that the test has failed. This indication of the test result can be provided by presenting the test result (e.g., an error code or "test successful" message) to a user (e.g., via a user interface), printing a report with the test result, writing the test result to a log, or by any other means.

When a different test needs to be performed, the test module 114 may send an expected result for this different test to the test server 106, which will again extract the expected test result from the request and send a response with the expected test result to the network application 112. The test server and/or the hosted test service do not need to be changed and redeployed for the second test. For example, if the first test is to ensure proper network communication when the network application 112 requests a certain file (e.g., the file including a message "Hello world!") from the test server 106, the test module 114 may add the test parameter "response body" and the expected result "Hello world!" to the URL of the client request and may send the client request to the test server 106. In the above example, the test service hosted by the test server 106 may then extract the message "Hello world!" from the client request without retrieving the requested file, add the extracted message to the body of the response and send the response to the network application 112. Upon receiving the response, the test module 114 may determine that the body of the response includes the expected message and report that the test has ended successfully.

Subsequently, the test module 114 may be configured to test network communication for a second test case in which, for example, a user enters an incorrect URL when requesting content over a network. In this example, the test module 114 may add the test parameter "status code" and the expected result "400" (indicating that the requested website is unavailable) to the URL of the client request and may send the client request to the test server 106. The test service hosted by the test server 106 may then extract the code 400 from the request, add the extracted code to the status code of the response and send the response to the network application 112. The test service and/or the test server 106 do not need to be modified to make the test server 106 be unavailable for the network application 112 because the test service only needs to extract the expected test result from the client request without performing the operation specified in the request (such as establishing a connection with the client to provide the requested content). Upon receiving the response, the test module 114 will determine that the status code includes the expected value and report that the test has ended successfully.

It should be noted that the examples described herein are provided for illustration only. One of ordinary skill in the art will understand that various other status codes can be tested and numerous other kinds of test cases can be performed with the embodiments of the invention without loss of generality.

Figure 2:
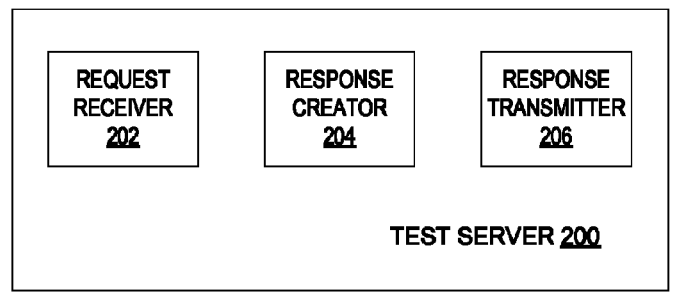
FIG. 2 is a block diagram of one embodiment of a test server.

FIG. 2 is a block diagram of one embodiment of a test server 200. The test server 200 may be the same as the test server 106 of FIG. 1. In one embodiment, the test server 200 hosts a test service that may include a request receiver 202, a response creator 204 and a response transmitter 206. Alternatively, the above components can be part of a web application or some other program hosted by the test server 200. The above components can be combined together or separated into further components, according to some embodiments.

The request receiver 202 receives client requests of different types, and parses each client request to identify one or more expected test results and one or more test parameters to be used for the current test. A test parameter specifies a portion of a server response (e.g., a status code of the response, a header of the response or a body of the response) that should include an expected test result. An expected test result is data that a client network application should identify in the server response if the current test is successful. In one embodiment, the test parameters and the expected test results may be included in the URL of the client request, and the request receiver 202 parses the URL of the client request and extracts the expected test results. Alternatively, the test parameters and the expected test results may be included in the header of the client request or the body of the client request.

The response creator 204 creates a response. The response creator 204 does not perform an operation specified in the client request but merely adds the expected test result to the portion of the response that is identified by the test parameter in the client request. For example, if the operation specified in the client request is to provide a file and the URL of the client request includes the content of the file, the response creator 204 may ignore the requested operation and may just copy the content extracted from the URL of the request and add it to the body of the response. The response transmitter 206 sends the response to the client network application.

The test server 200 can perform numerous tests of different types using a single test service (or a single test program). No changes to the test service or test program are needed for the different types of tests.

Figure 3:
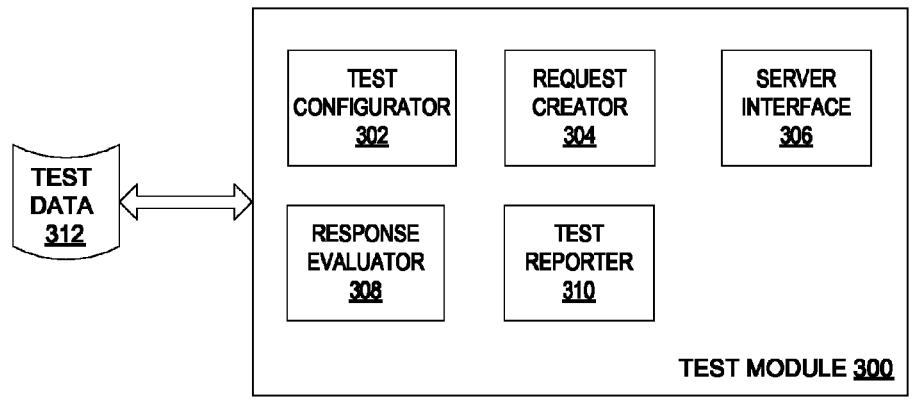
FIG. 3 is a block diagram of one embodiment of a test module of a network application.

FIG. 3 is a block diagram of one embodiment of a test module 300. The test module 300 may be the same as the test module 114 of FIG. 1. In one embodiment, the test module 300 includes a test configurator 302, a request creator 304, a server interface 306, a response evaluator 308 and a test reporter 310. The above components can be combined together or separated into further components, according to some embodiments.

The test configurator 302 configures the test module 300 for a specific test based on test data 312. The test data 312 may be part of a configuration file or another data structure (e.g., a database) modifiable based on user input provided via a user interface (e.g., a GUI or a command line interface) or by directly updating the data. The test data 312 specifies the address of the test server 106 to direct network traffic of the network application 112 to the test server 106. When testing of the network application 112 is completed, the network application 112 will be reconfigured to direct the traffic of the network application 112 to the production server(s) 108.

The test data 312 specifies one or more test parameters for a current test and one or more expected test results, and the test configurator 302 configures the test module 300 based on these data. In addition, in some embodiments, the test data 312 identifies subroutines of the network application 112 that should or should not be performed for the current test and the test configurator 302 enables/disables corresponding subroutines of the network application 112 and causes the network application 112 to be recompiled.

The request creator 304 creates a request and adds the test parameter(s) and the expected test result(s) to the request. In one embodiment, the request creator 304 adds the test parameter(s) and the expected test result(s) to the URL of the request. Alternatively, they are added to a predefined field of the header of the request or to the body of the request.

The server interface 306 sends the request to the test server. Subsequently, the server interface 308 receives a corresponding response from the test server and passes it to the response evaluator 308. In one embodiment, the server interface 306 sets a timer upon sending the request to the test server. If a corresponding response has not yet been received by the server interface 306 when the timer expires, the server interface 306 notifies the test reporter 310, which then indicates to a user that the current test has failed (via an error code, message, etc.).

The response evaluator 308 examines the portion of the server response identified by the test parameter, and determines whether this portion of the server response includes the expected test parameter. If so, the test reporter 310 indicates to the user that the test has completed successfully. If not, the test reporter 310 indicates to the user that the test has failed.

Figure 4:
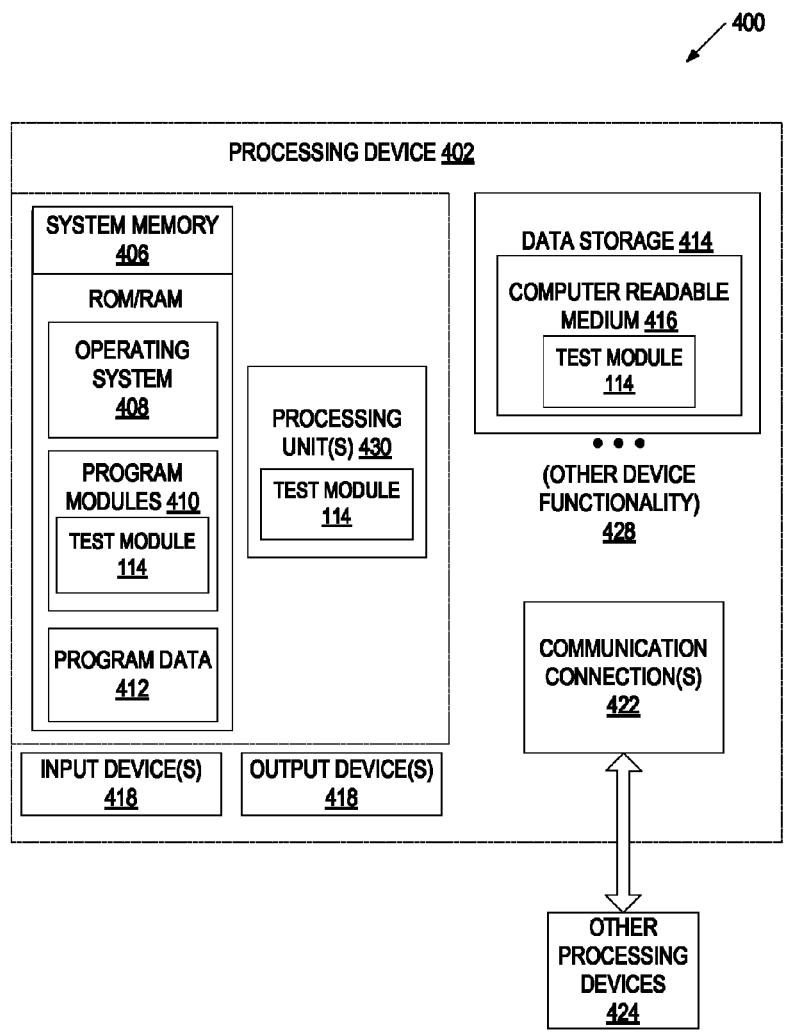
FIG. 4 is a block diagram illustrating an exemplary client device.

FIG. 4 is a block diagram illustrating an exemplary client device 400. The client device 400 may be the same as client device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The client device 400 includes one or more processing units 404, such as one or more CPUs. The client device 400 also includes system memory 406, which may correspond to any combination of volatile and/or non-volatile storage mechanisms. The system memory 406 may store information which provides an operating system component 408, various program modules 410 including test module 114, program data 412, and/or other components. The client device 400 performs functions by using the processing unit(s) 404 to execute the test module 114 and other instructions provided by the system memory 406.

The client device 400 may also include a data storage device 414 that may consist of one or more types of removable storage and/or one or more types of non-removal storage. The data storage device 414 may include a computer-readable medium 416 on which is stored one or more sets of instructions (e.g., instructions of the test module 114) embodying any one or more of the methodologies or functions described herein. As shown, instructions of the test module 114 may also reside, completely or at least partially, within the system memory 406 and/or within the processing unit(s) 430 during execution thereof by the client device 400, the system memory 406 and the processing unit(s) 430 also constituting computer-readable media. The instructions of the test module 114 may further be transmitted or received over a network.

The client device 400 may also include one or more input devices 418 (keyboard, mouse device, specialized selection keys, etc.) and one or more output devices 420 (displays, printers, audio output mechanisms, etc.). The client device 400 may further include one or more communication interface mechanisms 422. These communication interface mechanisms 422 allow the client device 400 to interact with other processing devices 424, such as remote computers, the test server 106, the production server(s) 108, and so forth. The communication interface mechanisms 422 may allow the client device 400 to receive an IP notification or an SMS message and also communicate with the test server 106 in a data mode.

The above-enumerated list of modules is representative and is not exhaustive of the types of functions performed by the client device 400. As indicated by the label "Other Device Functionality" 428, the client device 400 may include additional functions.

Figure 5:
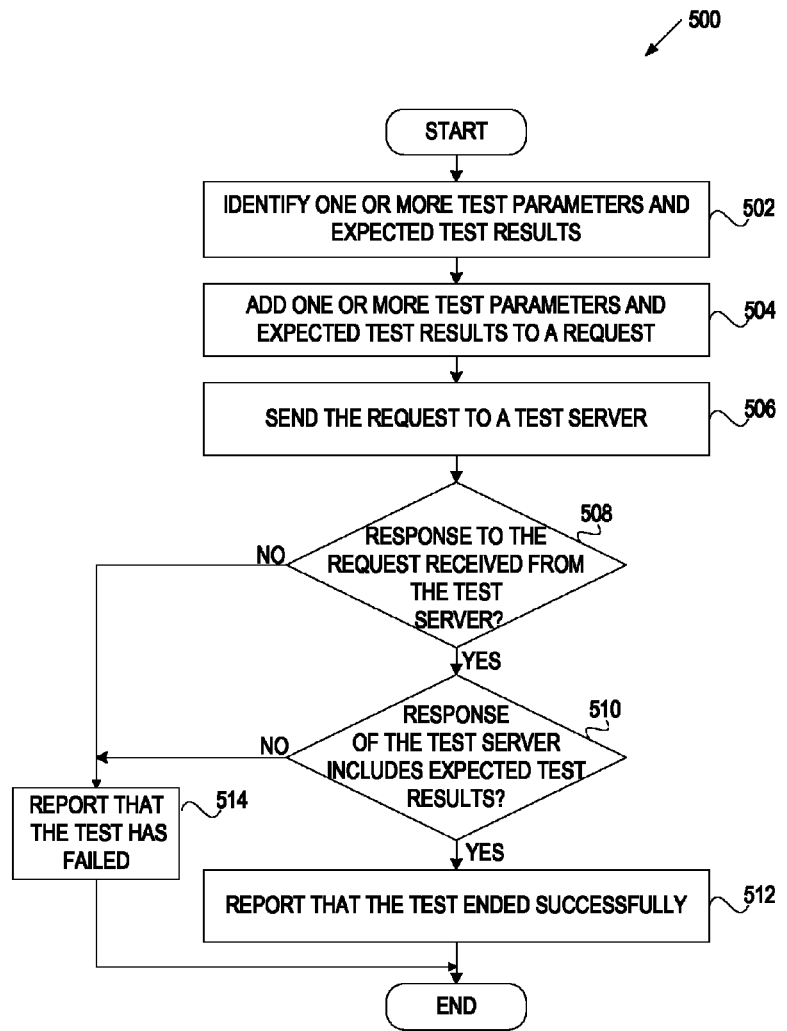
FIG. 5 is a flow diagram of one embodiment of a client-based method for network communication testing.

FIG. 5 illustrates a flow diagram of one embodiment of a client-based method 500 for network communication testing. The method 500 may be performed by processing logic that may comprise hardware (circuitry, dedicated logic, etc.), software (such as is run on a general purpose computer system or a dedicated machine), or a combination of both. In one embodiment, the method 500 is performed by a client (e.g., network application 112 of the client 102 of FIG. 1).

Referring to FIG. 5, method 500 begins with the client identifying one or more parameters for a specific test and one or more expected results for this test (block 502). A test may be intended to ensure proper communication when the client requests data from a server, when the format, the size or the contents of a client request is changed, when the format, the size, the contents or the response code of a server response is changed, etc. An expected test result may specify a test parameter value expected by the client, and a test parameter may identify the portion of a server response (e.g., a status code, a header or a body) that should include the expected test result.

At block 504, the client adds the test parameter(s) and the expected test result(s) to a client request. In one embodiment, they are added to the URL of the client request. Alternatively, they can be added to the header of the request or the body of the request.

At block 506, the client sends the client request to the test server. The test server may be a generic test server that facilitates different types of testing. In one embodiment, the client sets a timer upon sending the client request.

At block 508, the client determines whether a corresponding response has been received from the test server within a predetermined time period (e.g., as defined by the timer). If so, the method proceeds to block 510. If not, the method proceeds to block 514, where the client reports that the test has failed.

At block 510, the client determines whether the response received from the test server includes the expected test result(s). If not, the client reports that the test has failed (block 514). If so, the client reports that the test has ended successfully (block 512). If the test failed, further testing may be needed to identify a specific problem.

Figure 6:
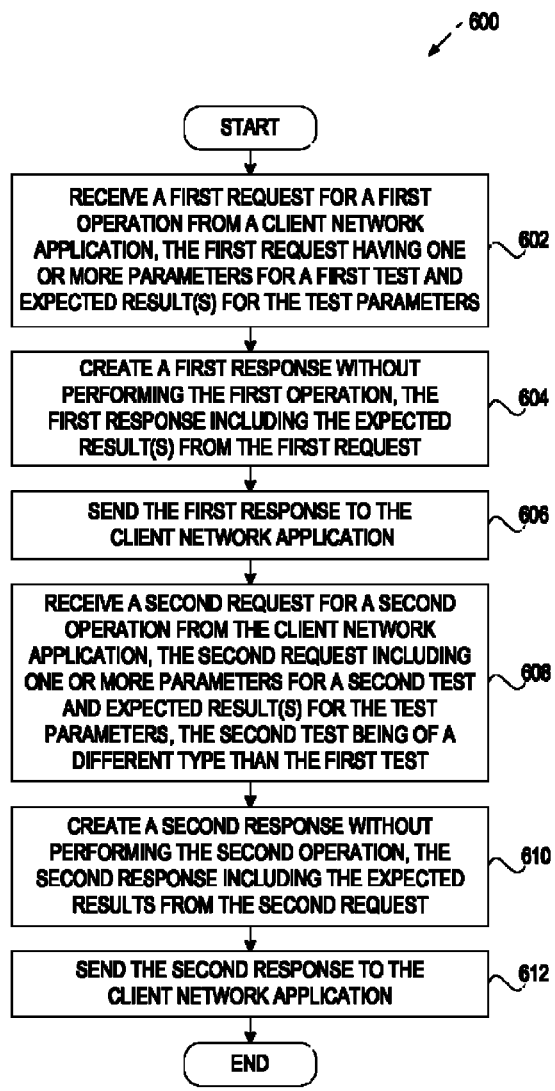
FIG. 6 is a flow diagram of one embodiment of a server-based method for network communication testing.

FIG. 6 illustrates a flow diagram of one embodiment of a server-based method 600 for network communication testing. The method 600 may be performed by processing logic that may comprise hardware (circuitry, dedicated logic, etc.), software (such as is run on a general purpose computer system or a dedicated machine), or a combination of both. In one embodiment, the method 600 is performed by a test server (e.g., a test service hosted by the test server 106 of FIG. 1).

Referring to FIG. 6, method 600 begins with the test server receiving a first request for a first operation from a client network application (block 602). The first request includes one or more parameters for a first test and one or more expected results for the first test. The first operation may be, for example, an operation to provide a specific file, the expected test result may be the content of the requested file, and the test parameter may be the body of the response.

At block 604, the test server creates a first response without performing the first operation. Rather, the test server includes the expected test result extracted from the first client request in the response. For example, the test server may add the content of the file extracted from the first client request (e.g., from the URL of the first client request) to the body of the first response. At block 606, the test server sends the first response to the client network application.

At block 608, the test server receives a second request for a second operation from the client network application. The second request includes one or more parameters for a second test and one or more expected results for the second test, where the second test is of a different type than the first test. The second test may be focused, for example, on receiving appropriate status code when a client requests connection with a server that is currently down, the second operation may be, for example, an operation to establish a connection with the test server, the expected test result may be "500" (an error code indicating that the server is down), and the test parameter may be the status code of the response.

At block 610, the test server creates a second response without performing the second operation. Rather, the test server includes the expected test result extracted from the second client request in the second response. For example, the test server may add "500" extracted from the second client request (e.g., from the URL of the second client request) to the status code of the second response. At block 612, the test server sends the second response to the client network application.

Examples of operations requested by a client may include establishing a connection with the client, acknowledging receipt of a client request, providing content, providing instructions, providing software upgrades and the like. As discussed above, in some embodiments, the test server ignores the operation requested by the client and merely extracts an expected test result from the client request and sends the extracted test result back to the client.

Figure 7:
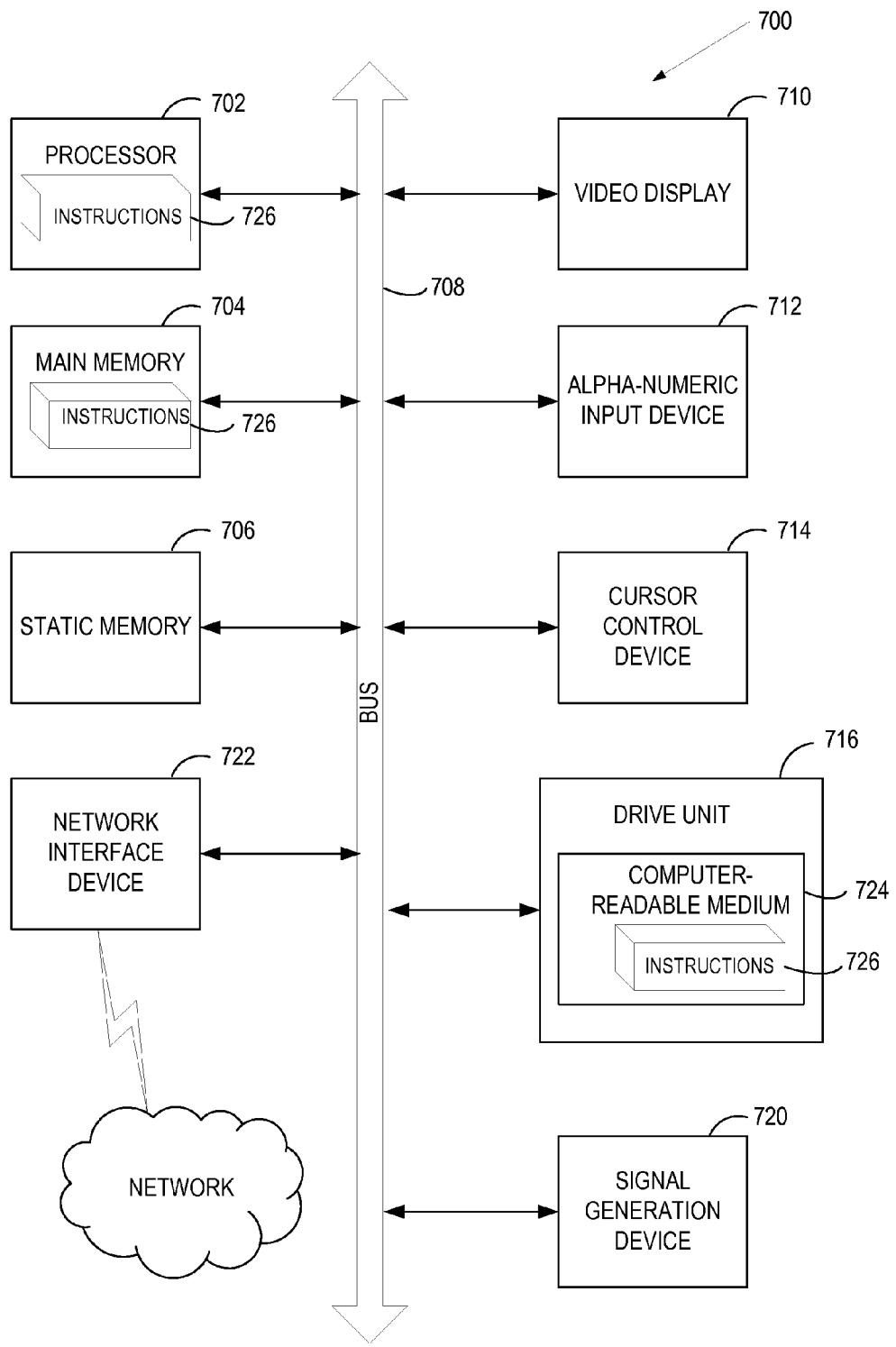
FIG. 7 illustrates an exemplary test server.

FIG. 7 illustrates an exemplary test server 700 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the test server 106 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of the test server 106) embodying any one or more of the methodologies or functions described herein. The instructions of the test server 106 may also reside, completely or at least partially, within the main memory 704 and/or within the processor 702 during execution thereof by the computer system 700, the main memory 704 and the processor 702 also constituting computer-readable media. The instructions of the test server 106 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "determining", "sending", "adding" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a client computer system, comprising:
    identifying, at the client computer system, one or more test parameters and one or more expected results for the one or more test parameters;
    adding, at the client computer system, the one or more test parameters and the one or more expected test results to a client request;
    sending, by the client computer system, the client request to a test server configured to process client requests of different types;
    receiving, at the client computer system, a server response from the test server in response to the client request;
    determining, at the client computer system, whether the server response includes the one or more expected test results from the client request;
    upon determining, at the client computer system, that the server response does not include the one or more expected test results, indicating that a test has failed; and
    upon determining, at the client computer system, that the server response includes the one or more expected test results, indicating that the test is successful,
    wherein the one or more test parameters specify a portion of the server response in which to include the one or more expected test results, the portion of the server response comprising at least one of a server response status code, a server response header or a server response body.

2. The method of claim 1 wherein the test server is configured to process client requests of different types without recompiling a test service hosted by the test server.

3. The method of claim 1 wherein the one or more test parameters and the one or more expected test results are added to a uniform resource locator (URL) of the client request.

4. The method of claim 1 further comprising:
receiving configuration information for the test via a user interface or a configuration file.

5. The method of claim 4 wherein the configuration information comprises the one or more test parameters, the one or more expected test results and an address of the test server.

6. The method of claim 1 wherein determining whether the server response includes the one or more expected test results comprises:
parsing the server response to extract at least one of the server response status code or the server response body.

7. A method, implemented by a server computer system, comprising:
receiving, by a test service hosted by the server computer system, a first request for a first operation from a client, the first request comprising one or more first test parameters and one or more first expected test results for the one or more first test parameters, the first request being associated with a first test of a client network application;
creating, by the test service, a first response without performing the first operation, the first response including the one or more first expected results from the first request;
sending the first response to the client;
receiving, by the test service, a second request for a second operation from the client, the second request comprising one or more second test parameters and one or more second expected test results for the one or more second test parameters, the second request being associated with a second test of the client network application, the second test being of a different type than the first test;
creating, by the test service, a second response without performing the second operation, the second response including the one or more second expected results from the second request; and
sending the second response to the client,
wherein the one or more first test parameters specify a portion of the first response in which to include the one or more first expected test results, the portion of the first response comprising at least one of a server response status code, a server response header or a server response body.

8. The method of claim 7 wherein the test service is not being changed for processing the second request.

9. The method of claim 7 wherein the one or more test parameters and the one or more expected test results are included in a Uniform Resource Locator (URL) of a corresponding one of the first request and second request.

10. The method of claim 7 wherein creating the first response without performing the first operation comprises:
when identifying a server response status code parameter, extracting an expected test result for the server response status code parameter from the first request of the client, and adding the extracted expected test result to the server response status code; and
when identifying a server response body parameter, extracting an expected test result for the server response body parameter from the first request of the client, and adding the extracted expected test result to the server response body.

11. A non-transitory computer readable medium including instructions that, when executed by a client computer system, cause the client computer system to perform a method comprising:
sending, by the client computer system, one or more test parameters and one or more expected results for the one or more test parameters in a client request to a test server;
receiving, at the client computer system, a server response from the test server in response to the client request;
determining, at the client computer system, whether the server response includes the one or more expected test results from the client request;
upon determining, at the client computer system, that the server response does not include the one or more expected test results, indicating that a test has failed; and
upon determining, at the client computer system, that the server response includes the one or more expected test results, indicating that the test is successful,
wherein the one or more test parameters specify a portion of the server response in which to include the one or more expected test results, the portion of the server response comprising at least one of a server response status code, a server response header or a server response body.

12. The non-transitory computer readable medium of claim 11 wherein the test server is configured to process client requests of different types without recompiling a test service hosted by the test server.

13. The non-transitory computer readable medium of claim 11 wherein the one or more test parameters and the one or more expected test results are added to a uniform resource locator (URL) of the client request.

14. The non-transitory computer readable medium of claim 11, wherein the method further comprises:
receiving configuration information for the test via a user interface or a configuration file, the configuration information comprising the one or more test parameters, the one or more expected test results and an address of the test server.

15. A non-transitory computer readable medium of claim 11 wherein determining whether the server response includes the one or more expected test results comprises:
parsing the server response to extract at least one of the server response status code or the server response body.

16. A server computer system comprising:
a memory; and
a processor coupled to the memory, the processor to:
receive a request for an operation from a client, the request comprising one or more test parameters and one or more expected test results for the one or more test parameters,
create a response without performing the operation, the response including the one or more expected results from the request, and
send the response to the client,
wherein the one or more test parameters specify a portion of the response in which to include the one or more expected test results, the portion of the response comprising at least one of a server response status code, a server response header or a server response body.

17. The system of claim 16 wherein the processor is further to receive a second request for a different type of test and to respond to the second request without being changed for responding to the different type of test.

18. The system of claim 16 wherein the one or more test parameters and the one or more expected test results are included in a Uniform Resource Locator (URL) of a corresponding one of the first request and second request.

19. A system of claim 16 wherein the processor is to create the response without performing the operation by:
- when identifying a server response status code parameter, extracting an expected test result for the server response status code parameter from the request of the client, and adding the extracted expected test result to the server response status code; and
- when identifying a server response body parameter, extracting an expected test result for the server response body parameter from the request of the client, and adding the extracted expected test result to the server response body.

* * * * *